3,192,389
PHOTOELECTRIC FEELER ALIGNMENT DEVICE FOR CHECKING PACKS OF ELONGATED ARTICLES
Alfred Schmermund, 62 Kornerstrasse, Gevelsberg, Westphalia, Germany
Filed Mar. 1, 1962, Ser. No. 176,623
5 Claims. (Cl. 250—222)

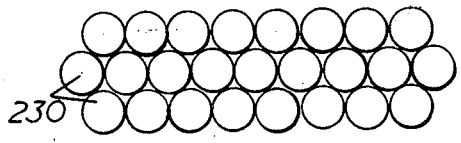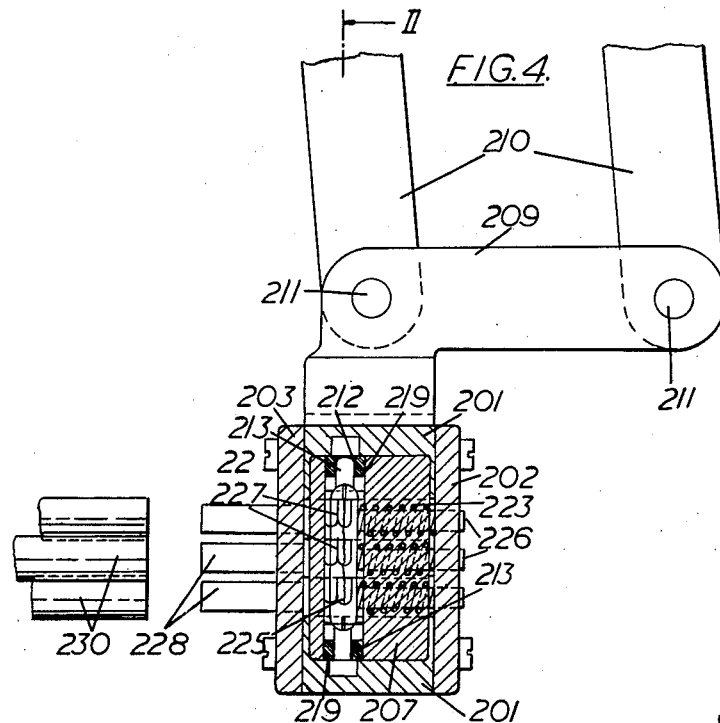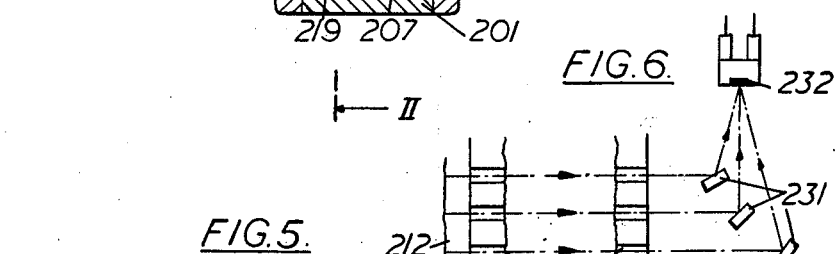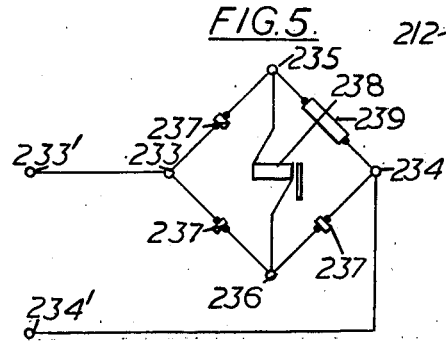

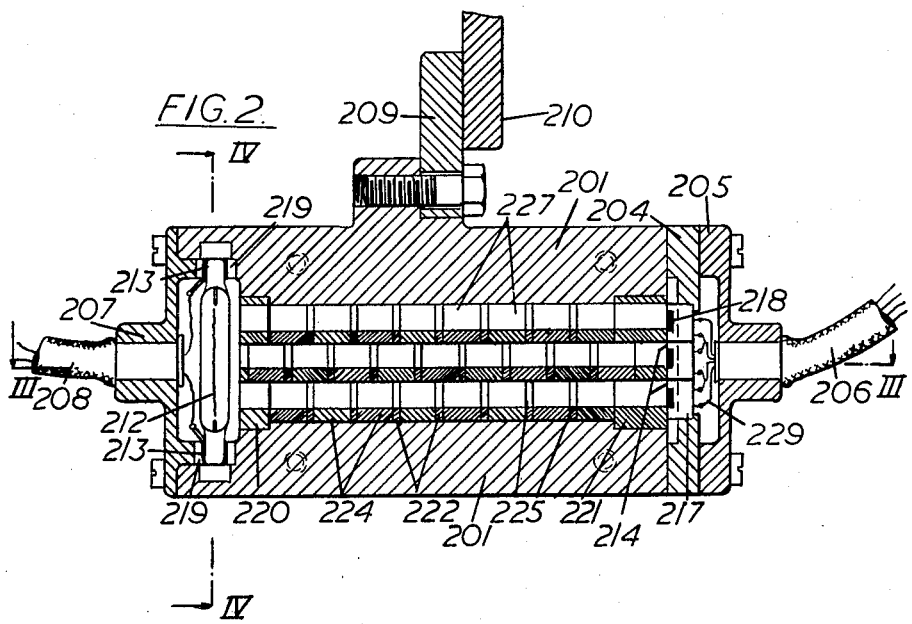
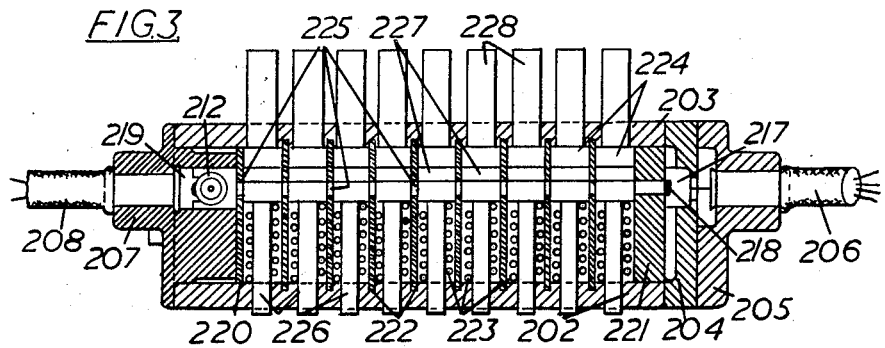
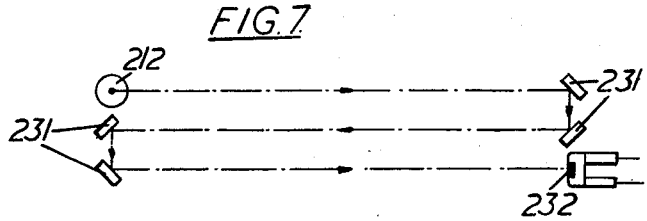
Inventor
ALFRED SCHMERMUND
By NOLTE AND NOLTE
Attorneys United States Patent Office 3,192,389
Patented June 29, 1965

The invention relates to devices for checking packs of elongated articles, and more specifically to devices for checking packs of cigarettes or cigars produced by packing machines for wrapping members of cigarettes or cigars. Such devices will hereinafter shortly be called "sensing devices."

In cigarette packing machines, cigarettes are usually fed for packing in the form of a block-like array of cigarettes in superposed layers. It has been proposed to sense the presence of the full number of cigarettes in such a block by means of a device having feelers, one for each cigarette, each feeler operating an electric contact when engaged by a cigarette, the contacts being so arranged that if one of the contacts is not operated, because a cigarette is missing in the block or is damaged or is misplaced, a signal is given. The contacts are liable to become soiled, or jammed open or closed by foreign bodies such as tobacco fibres, so that false signals may be given.

Accordingly, it is an object of the present invention to provide a sensing device having feelers which are mechanically independent of electric contacts.

It is another object of the invention to provide a sensing device comprising a light source, a light sensitive element adapted to exert a control or indicating effect in dependence on its illumination and a plurality of movably mounted feelers corresponding to a predetermined plurality of objects or articles, each feeler corresponding to one of said objects, means being provided for urging each feeler into a predetermined end position, from which it is movable into a further predetermined position if engaged by its corresponding object if present, the feelers being adapted and arranged for influencing a light path extending between the light source and the light sensitive element in such a manner that the amount of light reaching the light sensitive element from the light source is dependent on whether all the objects are present, and thus, all the feelers are in said further position, or whether at lease one object is absent and, thus, not all of the feelers are in said further position. Preferably, the feelers are elongated members mounted for movement in their longitudinal direction.

It is a further object of the invention to provide a sensing device for sensing the presence of objects or articles arranged in a layer or layers, the device comprising a plurality of feelers for engagement by the objects or articles, the feelers being movably mounted parallel to each other in a housing and urged by spring means in a direction opposite to a direction in which they are moved when engaged by objects and relative movement takes place between the housing and the said objects, each feeler having a light-transit passage, a light source and a light sensitive cell being provided, the light-transit passages being so positioned and the light source and light sensitive cell so aranged that when the feelers are moved to a predetermined extent on engagement by objects, the light-transit passages are aligned with each other and form a light path extending between the light source and the light sensitive cell, the light path being at least partially blocked by any feeler which is not moved by engagement of an object therewith, the light sensitive cell serving for controlling signal means for indicating that a feeler has not been engaged.

It is still another object of the invention to provide a sensing device for sensing the presence of objects or articles arranged in an array formed by a plurality of superposed layers, the feelers being arranged in a corresponding plurality of superposed layers, the light path being formed between the light source and the light sensitive cell with the aid of deflecting prisms or mirrors arranged to deflect light from the light source successively through the light transit passages of the respective layers of feelers.

It is a still further object of the invention to provide a sensing device wherein alternatively a common light source is provided for all the layers of feelers and one light sensitive cell provided for each layer of feelers, the light path being a multiple branch light path having one branch for each layer of feelers. Still alternatively, a common light source may be provided for all the layers of feelers and a common light sensitive cell may be provided for all the layers of feelers, the light path being a multiple branch light path having one branch for each layer of feelers, deflecting prisms or mirrors being provided for deflecting light from the light path branches onto the light sensitive cell.

Various sensing devices have previously been proposed, wherein a machine is automatically controlled by feelers operating shutters which influence a light beam emanated from a light source to impinge on a light sensitive cell, the control effect being dependent on the illumination of the cell.

It is a more specific object of the invention to provide a sensing device wherein means are provided for preventing diffusely reflected light or other unwanted stray light from reaching a light sensitive cell.

These and other objects and advantages of the invention will become apparent from the following detailed description of an embodiment of the invention when read in conjunction with the appended drawings, which are given by way of example and in which:

FIG. 1 is an end view of a block-like array of cigarettes;

FIG. 2 is a sectional view of a sensing device, along the line II—II of FIG. 4;

FIG. 3 is a sectional view of the sensing device, along the line III—III of FIG. 2;

FIG. 4 is a sectional view of the sensing device, along the line IV—IV of FIG. 2;

FIG. 5 is an electric circuit diagram of the sensing device;

FIG. 6 is a diagrammatic view illustrating a modified light path arrangement in the sensing device; and FIG. 7 is a diagrammatic view illustrating another modified light path arrangement in the sensing device.

The sensing device shown in FIGS. 2, 3 and 4 is arranged for the testing of blocks of twenty-five cigarettes arranged, as shown by the cigarettes 230 of FIG. 1, in three superposed layers, a layer of nine cigarettes being interposed between two layers of eight cigarettes, with the cigarettes of the layer of nine offset by one half of their diameter relative to the cigarettes of the layers of eight.

The sensing device comprises sensing feelers 228, arranged in a similar manner to the cigarettes 230, and movably mounted parallel to each other in a housing 201 having front and rear walls 203 and 202, end portions 226 of the feelers 228 passing through guide apertures in the rear wall 202. Each feeler has a first rectangular body portion 224 which is thicker than sensing ends of the feelers which form second portions extending through the wall 203. Each body portion 224 has a light-transit slot 227, the slots being in line with each other when the sensing ends of the feelers are in line with each other.

The feelers are separated from each other by dividing walls 222 and at the ends of the array of feelers, end walls 220 and 221 are provided. The dividing walls 222 and the end walls 220 and 221 have light-transit openings or slots 225 all of which are in line with each other. When the feelers 228 are not engaged by cigarettes they are held in the position shown in FIG. 3 by compression springs 223, the body portions 224 then abutting against the wall 203. In this position the dividing walls 222 and the end walls 220 and 221 mask the light-transit slots 227 of the feelers. If, however, the feelers 228 are engaged by the cigarettes 230 of the cigarette block, and the housing 201 moved relative to the cigarettes by a predetermined amount in a direction such that the springs 223 are compressed, the light transit slots 227 in the body portions 224 of the feelers are aligned with the light-transit slots 225 in the dividing walls 222 and the end walls 220 and 221.

The housing 201 has end covers 207 and 205. The end cover 207 is in the form of a carrier for a lamp 212, the lamp having terminal sleeves 213 connected by contacts 219 to a power supply cable 208. The end cover 205 serves for clamping to the remainder of the housing 201, a plate 204 carrying three light sensitive cells 217 which are separated by spacers 214 and which have light sensitive portions 218. The arrangement of the lamp 212 and the cells 217 is such that a light path having three parallel branches extends therebetween when the feelers 228 are moved by the abovesaid predetermined amount, the light path being blocked in one of the three branches by any feeler 228 not so moved.

The housing 201 is mounted on a bearing arm 209 which is connected by pivots 211 to links 210 of a known parallelogram link system and by means of which the sensing device is movable in a substantially rectilinear path towards the cigarettes 230 for engagement of the feelers 228 by the cigarettes 230 whereby to effect displacement of the feelers 228 into positions such that the light path between the lamp 212 and the light sensitive cells 217 is not blocked. If, however, a cigarette is missing from the block of cigarettes, or is misplaced or damaged, the feeler 228 intended for that cigarette will not be displaced or will not be displaced to the same extent as the other feelers, with the result that the light path is blocked in that branch thereof which would otherwise pass through the light-transit slot 227 of the relevant feeler. Thus, one of the light sensitive cells 217 does not receive any light from the lamp 212.

The light sensitive cells 217 are connected by wires 229 to a cable 206, and are arranged in a bridge circuit. Such a bridge circuit is shown in FIG. 5, where the light sensitive cells are photo-resistive cells and are indicated by reference numeral 237, the cells 237 constituting three arms of the bridge between the points 233 and 235, 233 and 236, and 236 and 234 while the arm of the bridge between points 234 and 235 is formed by a compensating resistor 239. An operating potential is applied to points 233 and 234 from terminals 233' and 234' and a relay 238 is connected between points 235 and 236. It will be appreciated that if the resistance of one of the cells 237 changes as a result of a blockage of light incidence thereon, the balance of the bridge is disturbed and the relay 238 operated. The relay 238 may be used for controlling signal means for indicating that a feeler has not been engaged. Such signal means may be formed by a device for shutting off the cigarette packing machine or for ensuring that the relevant cigarette block is not packed.

Instead of using three light sensitive cells, a single cell 232 may be used as shown in FIG. 6. In this case light deflecting prisms or mirrors 231 are provided for deflecting light from the three branches of the light path, onto the light sensitive cell 232. In this case the cell 232 would be connected in a known electric circuit so arranged that reduction of the light incident on the cell 232, by as little as one third, causes operation of signal means.

When using a single light sensitive cell, instead of using a lamp which is sufficiently long as to directly provide light for the three layers of feelers, a compact lamp 212 may be used and the light therefrom passed successively through the light path branches formed by the aligned light-transit slots of the three layers of feelers. In this case the light is deflected from one branch to the other by deflecting prisms or mirrors 231.

Instead of using photo-resistive light sensitive cells, photo-electric cells or photo-voltaic cells may be used in appropriate known circuit arrangements.

Other modifications are possbile, for example instead of having light-transit slots, the feelers may be arranged for blocking light or may comprise light-blocking projections that when none of the feelers has been engaged by a cigarette or when all of the feelers have been engaged by cigarettes, the projections jointly block the light path between the lamp and the light sensitive cell or cells, whereas when one or more (but not all) of the feelers has not been engaged by a cigarette, and consequently the corresponding cigarette or cigarettes is or are missing or damaged, the respective feeler or each of the respective feelers does not have the correct position relative to the other feelers and thus does not complete the blockage of the light path. In this case, of course, the light sensitive cell or each cell is arranged for exercising the control or indicating effect when illuminated, whereas in the described embodiment the cell or each cell exercises the control or indicating effect when illumination thereof is interrupted or weakened.

It will be recognized, especially from FIG. 3, that by the provision of the dividing walls 222 between adjacent feelers 228 and by the provision of the rectangular body portions 224 which are thicker than the sensing ends of the feelers 228 diffusely reflected light or other unwanted stray light is effectively prevented from reaching the light sensitive cells 217.

It should be clearly understood that the embodiments hereinbefore described and illustrated in the appended drawings is given by way of example only. Many modifications, omissions and additions are possible without departing from the spirit of the present invention.

I claim:

1. In a device for checking a pack of elongated articles of the type comprising a plurality of elongated parallel feelers movable in their longitudinal direction, spring means for urging said feelers into a first end position, means for pressing said feelers and said articles against one another thereby to displace feelers against the action of said spring means into a second end position, and means for exerting an effect if at least one of said feelers has not been displaced into said second end position, the combination comprising a light tight housing accommodating said feelers with feeler ends protruding through openings in said housing when said feelers are in said first end position, a portion within said housing of each feeler being thicker than the protruding end of said feeler, a dividing wall between each pair of thickened portions of adjacent feelers, a light source in said housing, and a light sensitive cell in said housing, each thickened portion of said feelers having a light transit slot and each dividing wall having a light transit opening, said light transit slots and light transit openings being aligned with one another when the said feelers are in one of said end positions to form a light path between said light source and said photosensitive cell, said light transit slots and light transit openings being out of alignment when said feelers are in the other one of said end positions, said light path being interrupted when at least one of said feelers is in said other one of said two end positions.

2. The combination defined in claim 1 for sensing articles arranged in a plurality of superposed layers, wherein said feelers are arranged in a corresponding plurality of superposed layers, a separate light sensitive cell being provided for each layer.

3. The combination defined in claim 1, for sensing articles arranged in a plurality of superposed layers, wherein said feelers are arranged in a corresponding plurality of superposed layers, a single light sensitive cell being common to said plurality of layers of feelers, light deflecting means being provided for deflecting light to said common light sensitive cell, said deflecting means being arranged exclusively at the ends of said light paths remote from said light source.

4. The combination defined in claim 1, for sensing articles arranged in a plurality of superposed layers, wherein said feelers are arranged in a corresponding plurality of superposed layers, a single light sensitive cell being common to said plurality of layers of feelers, light deflecting means being provided for deflecting light to said common light sensitive cell, said deflecting means being arranged alternately at opposite ends of succeeding light paths.

5. The combination defined in claim 1, and comprising a parallel link system attached to said housing for moving said housing substantially rectilinearly towards and away from said articles.

References Cited by the Examiner
UNITED STATES PATENTS

| | | | |
|---|---|---|---|
| 1,682,464 | 8/28 | Arelt et al. | 53—65 |
| 1,731,127 | 10/29 | Diehle | 250—220 X |
| 1,962,742 | 6/34 | Jongedyk | 250—221 X |
| 1,980,294 | 11/34 | Ross et al. | 250—221 X |
| 2,168,886 | 8/39 | Roberts | 250—221 X |
| 2,448,830 | 9/48 | Robbins et al. | 250—219 |
| 2,807,728 | 9/57 | Kilburn et al. | 250—219 |
| 3,037,420 | 6/62 | Stade | 250—220 X |

RALPH G. NILSON, *Primary Examiner.*

ARCHIE R. BORCHELT, *Examiner.*